United States Patent
Kambayashi et al.

(10) Patent No.: US 9,604,860 B2
(45) Date of Patent: Mar. 28, 2017

(54) SUSPENSION PROCESSING DEVICE

(71) Applicant: Hitachi, Ltd., Chiyoda-ku, Tokyo (JP)

(72) Inventors: Takuya Kambayashi, Tokyo (JP); Kentaro Nakamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/913,136

(22) PCT Filed: Aug. 22, 2013

(86) PCT No.: PCT/JP2013/072379
§ 371 (c)(1),
(2) Date: Feb. 19, 2016

(87) PCT Pub. No.: WO2015/025395
PCT Pub. Date: Feb. 26, 2015

(65) Prior Publication Data
US 2016/0194219 A1    Jul. 7, 2016

(51) Int. Cl.
*C02F 1/36* (2006.01)
*B01D 43/00* (2006.01)

(52) U.S. Cl.
CPC .............. *C02F 1/36* (2013.01); *B01D 43/00* (2013.01)

(58) Field of Classification Search
CPC .......... B01D 21/283; B01D 2021/0081; B01D 43/00; B01J 19/10; C02F 1/36
See application file for complete search history.

(56) References Cited

U.S. PATENT DOCUMENTS

| 3,076,544 A | 2/1963 | Bodine, Jr. |
| 4,015,464 A | 4/1977 | Miller et al. |
| 5,085,783 A | 2/1992 | Feke et al. |
| 5,164,094 A | 11/1992 | Stuckart |
| 5,391,144 A * | 2/1995 | Sakurai ............ A61B 17/22012 601/3 |
| 2010/0078384 A1* | 4/2010 | Yang .................... B01D 21/283 210/645 |

FOREIGN PATENT DOCUMENTS

| JP | 2-503528 A | 10/1990 |
| JP | 2723182 B1 | 3/1998 |
| JP | 2004-24959 A | 1/2004 |

OTHER PUBLICATIONS

International Search Report (PCT/ISA/210) issued in PCT Application No. PCT/JP2013/072379 dated Oct. 15, 2013 with English-language translation (four (4) pages).

* cited by examiner

*Primary Examiner* — Walter D Griffin
*Assistant Examiner* — Cameron Allen
(74) *Attorney, Agent, or Firm* — Crowell & Moring LLP

(57) ABSTRACT

Provided is a technique capable of reducing power consumption at driving time in relation to a suspension processing device using an ultrasonic wave. A suspension processing device 1A is provided with a suspension processing unit 3A configured of a flow channel unit 30 in which a suspension flows, and a drive control unit 2A that controls driving of the suspension processing unit 3A. The suspension processing unit 3A has a first oscillator 40a and a second oscillator 40b provided in the flow channel unit 30. The drive control unit 2A includes a signal amplifier 22. A first oscillator 40a and a second oscillator 40b are electrically connected to each other via the signal amplifier 22, and the ultrasonic wave is generated between the first oscillator 40a and the second oscillator 40b.

14 Claims, 9 Drawing Sheets

SUSPENSION PROCESSING DEVICE

TECHNICAL FIELD

The present invention relates to a technique of processing suspension. Further, the present invention relates to a suspension processing device using an ultrasonic wave.

BACKGROUND ART

A suspension processing device using an ultrasonic wave according to a conventional example has a function generator and the like, as an external circuit for drive control, in which an ultrasonic oscillator and a reflection plate are arranged as a pair through a flow channel unit in which suspension flows. The function generator is a waveform generator that generates a waveform signal for control to be applied to the ultrasonic oscillator. The suspension processing device applies the waveform signal to the ultrasonic oscillator such that a sound field is generated by the ultrasonic wave between the ultrasonic oscillator and the reflection plate, and captures fine particles, solids and the like inside the flow channel unit. Accordingly, the solids and the like are separated from the suspension.

Examples of the related art relating to the suspension processing described above include Japanese Patent No. 2723182 (Patent Document 1) and Japanese Patent Application Laid-Open Publication No. 2004-24959 (Patent Document 2).

Patent Document 1 describes a non-contact manipulation method of fine particles in suspension using an ultrasonic wave oscillated by a rectangular oscillator having a plurality of electrodes.

Patent Document 2 describes a technique of capturing a fine object at a node or an antinode of sound pressure in a standing wave sound field to be generated in a flow channel by installing an oscillator and a reflection plate in parallel in the flow channel, and causing an ultrasonic wave to be reflected by the reflection plate. As described in Patent Document 2, it is possible to concentrate and separate solids in a liquid by modulation of an input signal to the oscillator even with a combination of the single oscillator and the reflection plate.

Any one of the above-described examples of the related art describes a technique of capturing, conveying, concentrating, separating or filtering the fine particles, the solids, or the like in the suspension or a liquid medium in a non-contact manner using the ultrasonic wave to be generated by the ultrasonic oscillator.

RELATED ART DOCUMENTS

Patent Documents

Patent Document 1: Japanese Patent No. 2723182
Patent Document 2: Japanese Patent Application Laid-Open Publication No. 2004-24959

SUMMARY OF THE INVENTION

Problems to be Solved by the Invention

The suspension processing device using the ultrasonic wave described above has a problem in relation to a configuration of the circuit and power consumption of the circuit at driving time of the suspension processing. Any technique of the above-described examples of the related art requires the waveform signal, which is generated by the function generator, to be amplified and be input to the oscillator in order for the driving to generate the ultrasonic wave from the oscillator. Thus, the suspension processing device needs to be provided with a circuit such as the above-described function generator as the circuit for drive control, and accordingly, power for driving such a circuit is required.

An object of the present invention is to provide a technique capable of reducing power consumption at driving time in relation to a suspension processing device using an ultrasonic wave.

Means for Solving the Problems

A representative embodiment of the present invention is a suspension processing device, using an ultrasonic wave, which is characterized by having a configuration to be illustrated hereinafter.

According to an embodiment of the present invention, a suspension processing device is provided with a suspension processing unit configured of a flow channel unit in which a suspension flows and a drive unit that drives the suspension processing unit, and the suspension processing unit is provided with two or more oscillators including a first oscillator and a second oscillator so as to sandwich at least a part of a region of the flow channel unit, the drive unit includes a signal amplification unit, the first oscillator and the second oscillator are electrically connected to each other via the signal amplification unit, the signal amplification unit amplifies an electrical signal from the second oscillator and inputs the amplified electrical signal to the first oscillator, and processing that separates a fine particle or a solid from the suspension is performed by generating an ultrasonic wave in the region of the flow channel unit between the first oscillator and the second oscillator.

Effects of the Invention

According to a representative embodiment of the present invention, it is possible to reduce the power consumption at driving time in relation to the suspension processing device using the ultrasonic wave.

BRIEF DESCRIPTIONS OF THE DRAWINGS

DETAILED DESCRIPTION OF PREFERRED EMBODIMENTS

Hereinafter, embodiments of the invention will be explained in detail with reference to the drawings. Note that, in all drawings for explanation of the embodiments, the same members basically have the same signs and their repetitive explanation will be omitted. Directions to be used for description are represented by X, Y and Z. Here, X and Y represent the directions that configure a horizontal plane, and Z is a vertical direction. For the sake of explanation, fine particles, solids or the like, which are objects to be processed for separation and the like, will be abbreviated as the "solids" in some cases.

<Outline>

A suspension processing device of each embodiment has a configuration suitable for application of water purification. Suspension such as plant effluent is separated into a concentrate liquid, which contains a large number of the fine particles, the solids or the like, and a clear liquid, other than the concentrate liquid, as suspension processing or water purification processing using the suspension processing device.

The suspension processing device of each embodiment is provided with a suspension processing unit configured of a flow channel unit in which the suspension flows, and a drive control unit that includes a signal amplifier for driving the suspension processing unit. A pair of oscillators is provided in the suspension processing unit so as to sandwich the flow channel unit. A first oscillator and a second oscillator are electrically connected to each other via the signal amplifier. An ultrasonic wave is generated by oscillation in the flow channel unit between the oscillators due to self-excited oscillation in a circuit formed of the pair of oscillators and the signal amplifier, and a sound field is formed inside the flow channel unit. The fine particle, the solids or the like are captured and separated from the suspension flowing inside the flow channel unit in the sound field.

First Embodiment

A description will be given regarding a suspension processing device using an ultrasonic wave according to a first embodiment of the present invention with reference to FIGS. 1 to 4. A suspension processing device 1A of the first embodiment has a pair of oscillators 40 which is arranged in a suspension processing unit 3A that configures a flow channel unit 30. The pair of oscillators 40 is electrically connected to each other via a signal amplifier 22. A sound field is generated by an ultrasonic wave between the oscillators 40 in the flow channel unit 30 due to self-excited oscillation in a circuit formed of the oscillators 40 and the signal amplifier 22. The solids that contained in suspension 51 inside the flow channel unit 30 are captured and separated in the sound field.

[Suspension Processing Device and System]

Figure 1:
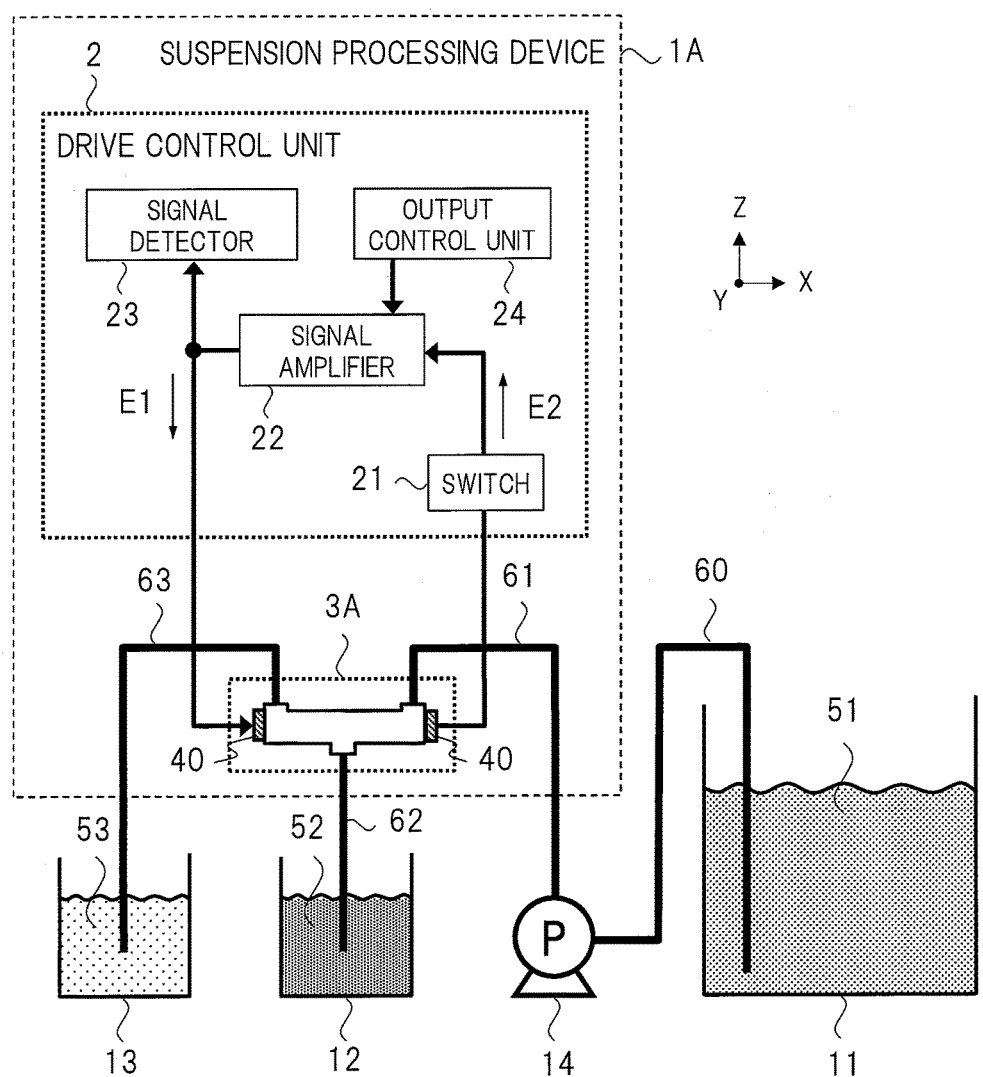
FIG. 1 is a diagram illustrating a configuration of a system that includes a suspension processing device using an ultrasonic wave according to a first embodiment of the present invention.

FIG. 1 illustrates a configuration of a system that includes the suspension processing device 1A using the ultrasonic wave according to the first embodiment. FIG. 1 illustrates a configuration example of the system that processes the suspension using the suspension processing device 1A. The entire system of FIG. 1 has the configuration that includes the suspension processing device 1A, a suspension tank 11, a liquid feed pump 14, a concentrate liquid tank 12, and a clear liquid tank 13.

The suspension processing device 1A of the first embodiment is provided with the suspension processing unit 3A and a drive control unit 2 which is connected to the suspension processing unit 3A. The suspension processing unit 3A is configured of the flow channel unit 30 (FIG. 2 to be described later) in which the suspension 51 is processed while flowing, and is discharged in the state of being separated into a concentrate liquid 52 and a clear liquid 53. The drive control unit 2 is a circuit unit that performs control for driving the suspension processing unit 3A. The suspension 51 is separated into the concentrate liquid 52 and the clear liquid 53 using the ultrasonic wave, generated by the pair of oscillators (FIG. 2 to be described later), as a function of the suspension processing according to the suspension processing device 1A.

The suspension tank 11 is a tank filled with the suspension 51. The suspension tank 11 and the liquid feed pump 14 are connected to each other via a liquid feed tube 60, and the liquid feed pump 14 and a supply port 31 (FIG. 2 to be described later) of the suspension processing unit 3A are connected to each other via a liquid feed tube 61. The suspension 51 of the suspension tank 11 is supplied to the supply port 31 of the suspension processing unit 3A through the liquid feed tube 60 and the liquid feed tube 61 by the liquid feed pump 14.

The concentrate liquid tank 12 is a tank to which the concentrate liquid 52 is discharged. The concentrate liquid tank 12 is connected to a concentrate port 32 (FIG. 2 to be described later), which is a first outlet port of the suspension processing unit 3A, through a liquid feed tube 62, and the concentrate liquid 52 from the suspension processing unit 3A is discharged thereto.

The clear liquid tank 13 is a tank to which the clear liquid 53 is discharged. The clear liquid tank 13 is connected to an outlet port 33 (FIG. 2 to be described later), which is a second outlet port of the suspension processing unit 3A, through a liquid feed tube 63, and the clear liquid 53 from the suspension processing unit 3A is discharged thereto.

The suspension 51 is suspension as an object to be processed in which the fine particle, the solids or the like are dispersed into a liquid, and is plant effluent, for example. The suspension 51 is discharged in the state of being separated into the concentrate liquid 52 and the clear liquid 53 through the suspension processing performed by the suspension processing device 1A.

The concentrate liquid 52 is a processing liquid or a discharging liquid that contains relatively a large number of solids among processing liquids as the outcome of the suspension 51 that has been processed. The clear liquid 53 is a processing liquid other than the concentrate liquid 52 among the processing liquids as the outcome of the suspension 51 that has been processed, and is the processing liquid or a discharging liquid that contains relatively a small number of solids.

[Suspension Processing Unit]

Figure 2:
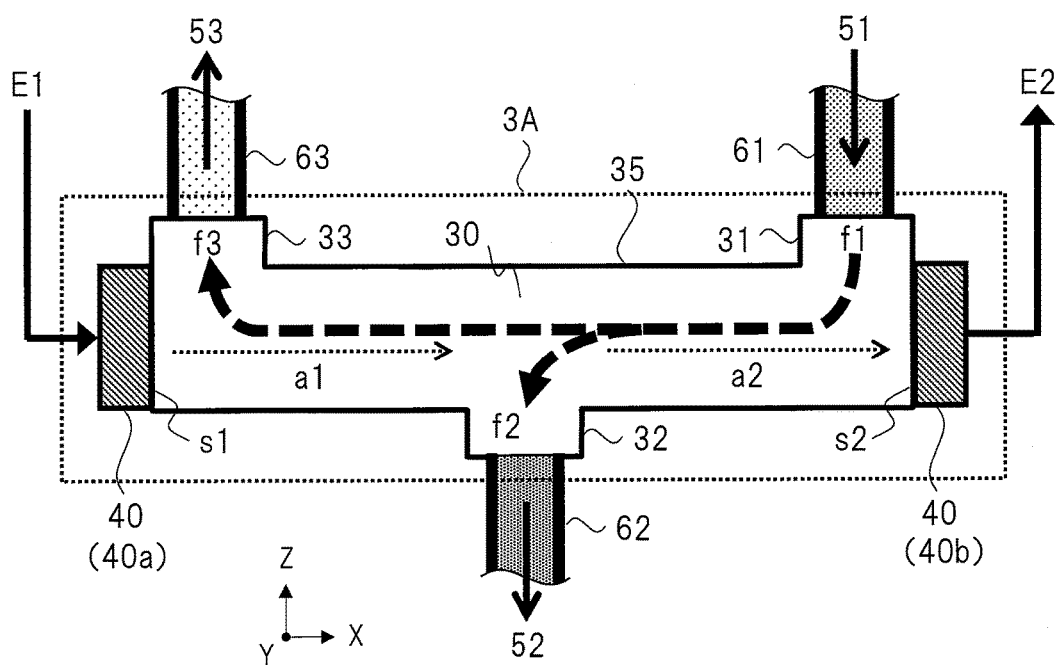
FIG. 2 is a diagram illustrating a structure of a suspension processing unit of the suspension processing device of the first embodiment in an XZ cross-section.

FIG. 2 illustrates a structure and flow and the like of the suspension processing unit 3A of FIG. 1 in an XZ cross-section. The suspension processing unit 3A is mainly provided with a tubular structure body 35A that configures the flow channel unit 30, and the pair of oscillators 40 which is provided to sandwich a region of the flow channel unit 30. The tubular structure body 35A of the flow channel unit 30 is provided with the supply port 31, the concentrate port 32 and an outlet port 33 as opening portions.

In the suspension processing unit 3A, the flow channel unit 30 of the tubular structure body 35A is arranged inside a space of (X, Y, Z) as illustrated in FIG. 2. That is, the flow channel unit 30 of the tubular structure body 35A has a long axis which is arranged in the X direction, and a short axis and a radius which are arranged in the Z direction and the Y direction, respectively. A YZ cross-section of the tubular structure body 35A has a circular shape, for example. The tubular structure body 35A has at least three or more surfaces. The pair of oscillators 40 is arranged on two surfaces, which oppose each other in the X direction, among the surfaces of the tubular structure body 35A, and the supply port 31 or the like is provided on a tubular side surface which is the other surface.

The suspension 51 flows into the flow channel unit 30 from the supply port 31, and the flow channel unit 30 is subjected to processing such as the separation due to the action of the sound field caused by the ultrasonic wave between the pair of oscillators 40. Some of the processed suspension 51 is discharged from the concentrate port 32, which is the first outlet port, as the concentrate liquid 52, and the other one is discharged from the outlet port 33, which is the second outlet port, as the clear liquid 53. Note that the inside of the flow channel unit 30 is filled with the suspension 51 or the processing liquid thereof, although not illustrated.

The supply port 31 is connected to an end portion in the downward Z direction of the liquid feed tube 61, and the suspension 51 flows into the liquid feed tube 61. The supply port 31 is arranged to be opened in the upward Z direction in the vicinity of a right end portion in the X direction of the side surface, which has a circular cross-section, of the tubular structure body 35A.

The concentrate port 32 is the first outlet port, is connected to an end portion in the upward Z direction of the liquid feed tube 62, and allows the concentrate liquid 52 to be discharged therefrom. The concentrate port 32 is arranged to be opened in the downward Z direction at a position in the vicinity of the middle in the X direction of the tubular structure body 35A.

The outlet port 33 is the second outlet port, is connected to an end portion in the downward Z direction of the liquid feed tube 63, and allows the clear liquid 53 to be discharged therefrom. The outlet port 33 is arranged to be opened in the upward Z direction in the vicinity of a left end portion in the X direction of the side surface of the tubular structure body 35A.

There is flow like f1, f2 or f3 in the flow channel unit 30 as the flow of the suspension 51 and the like. The suspension 51 flows from the supply port 31 on the right side in the X direction into the flow channel unit 30 like f1. The suspension 51 flows in the flow channel unit 30 from the right side in the X direction, which is an upper stream, toward the left side in the X direction, which is a downstream, through the X direction which is the long axis. One flow of f1 is discharged, as the concentrate liquid 52, from the concentrate port 32 in the vicinity of the middle in the X direction like f2. The other flow of f1 is discharged, as the clear liquid 53, from the downstream outlet port 33 on the left side in the X direction like f3.

A flowing direction of the suspension 51 is changed from the downward Z direction to the leftward X direction, between in the liquid feed tube 61 and in the flow channel unit 30 like f1. A flowing direction of the concentrate liquid 52 is changed from the leftward X direction to the downward Z direction, between in the flow channel unit 30 and in the liquid feed tube 62 like f2. A flowing direction of the clear liquid 53 is changed from the leftward X direction to the upward Z direction, between in the flow channel unit 30 and in the liquid feed tube 63 like f3.

In the first embodiment, the solids are captured from the flowing suspension 51 due to the action of the ultrasonic wave in the flow channel unit 30 having the long axis in the X direction. The captured solids settle toward the lower side in the Z direction by their own weight due to flocculation. Accordingly, a large number of solids are collected at a bottom portion on the lower side in the Z direction in the flow channel unit 30. In correspondence with this, the concentrate port 32 of the flow channel unit 30 is provided at any position in the bottom portion on the lower side in the Z direction between the supply port 31 on the right side and the outlet port 33 on the left side in the X direction. In particular, the concentrate port 32 is provided at the position in the vicinity of the middle in the X direction of the bottom portion of the flow channel unit 30 in the first embodiment. Further, the outlet port 33 of the flow channel unit 30 is provided at a position on the upper side in the Z direction on the right side in the X direction.

[Oscillator]

A first oscillator 40a and a second oscillator 40b as the pair of oscillators 40 are electrically connected to each other via the signal amplifier 22. The first oscillator 40a, the second oscillator 40b, and the signal amplifier 22 configure the circuit with intervention of the flow channel unit 30, and the self-excited oscillation is generated by the circuit.

The oscillator 40 is an ultrasonic oscillator, and is an element that converts the electrical signal and the ultrasonic wave caused by oscillation. The oscillator 40 has a structure, for example, in which an oscillating plate having an oscillating surface and an electrode are connected to each other. The electrode of the oscillator 40 is connected to the signal amplifier 22 through a conducting wire. The first oscillator 40a is an input side of an electrical signal E1, and is connected to an output side of the signal amplifier 22 through a conducting wire. The second oscillator 40b is an output side of an electrical signal E2, and is connected to an input side of the signal amplifier 22 through a conducting wire.

The first oscillator 40a and the second oscillator 40b, which are the pair of oscillators 40, are provided to be separated at both right and left ends in the X direction so as to sandwich a region in which the suspension 51 flows in the long axis of the flow channel unit 30. The pair of oscillators 40 is arranged on a straight line in the X direction which is the main flowing direction in the flow channel unit 30 such that an oscillating surface s1 of the first oscillator 40a and an oscillating surface s2 of the second oscillator 40b oppose each other in parallel. The pair of oscillators 40 is arranged so as to sandwich at least a part of the region of the flow channel unit 30 filled with the suspension 51, that is, to sandwich substantially the entire region in the X direction of the flow along the long axis in the first embodiment.

The second oscillator 40b is arranged in a YZ plane of an end portion at the upstream right side in the X direction of the flow channel unit 30, and the first oscillator 40a is arranged in the YZ plane of an end portion at the downstream left side in the X direction. The first oscillator 40a emits the ultrasonic wave to the right side in the X direction inside the flow channel unit 30 like a1. The second oscillator 40b receives the ultrasonic wave toward the right side in the X direction from the inside of the flow channel unit 30 like a2.

Further, the supply port 31 and the outlet port 33 are arranged corresponding to the arrangement of the pair of oscillators 40. That is, the supply port 31 is arranged at a neighboring left side in the vicinity of the second oscillator 40b at a right end in the X direction on the side surface of the tubular structure body 35A of the flow channel unit 30. The outlet port 33 is arranged at a neighboring right side in the vicinity of the first oscillator 40a at a left end in the X direction on the side surface of the tubular structure body 35A of the flow channel unit 30.

The oscillating surface s1 of the first oscillator 40a and the oscillating surface s2 of the second oscillator 40b oppose each other in parallel in the YZ plane that corresponds to the short-axis direction of the flow channel unit 30. Each of the oscillating surfaces is arranged to be oriented in the X direction in the flow channel unit 30. Central axes in the X direction of the respective oscillating surfaces match each other. The YZ plane of the oscillator 40 has a circular shape, for example, so as to correspond to the cross-sectional shape of the tubular structure body 35A, but may have a rectangular shape without being limited thereto.

The oscillating surface s1 of the first oscillator 40a is connected so as to be exposed to the inside of the flow channel unit 30 on a left end surface of the flow channel unit 30. The oscillating surface s2 of the second oscillator 40b is connected so as to be exposed to the inside of the flow channel unit 30 on a right end surface of the flow channel unit 30. Note that the oscillating surface s1 of the first oscillator 40a may be connected in contact with an outer side of the left end surface of the flow channel unit 30 as a modification example. The oscillating surface s2 of the second oscillator 40b may be connected in contact with an outer side of the right end surface of the flow channel unit 30.

[Drive Control Unit]

The drive control unit 2 of FIG. 1 has a circuit configuration that includes a switch 21, a signal amplifier 22, a signal detector 23, an output control unit 24, and a wiring that connects the respective units. The drive control unit 2 is implemented, for example, using an electronic circuit board and the like. Note that the drive control unit 2 is connected to a power supply unit (not illustrated), and power is supplied from the power supply unit to the signal amplifier 22 and the like.

The switch 21 switches electrical connection of the signal amplifier 22 and the oscillator 40 between an ON state and an OFF state based on an operation of a user of the suspension processing device 1A. When the user turns on the switch 21 at the time of the suspension processing, a state of the electrical connection of the pair of oscillators 40 and the signal amplifier 22 is turned into the ON state, and power is supplied to the signal amplifier 22 and the like.

In the above-described ON state, a phenomenon (referred to as the self-excited oscillation) in which the electrical signal and the ultrasonic wave are automatically excited, and are repeatedly amplified is caused in the circuit that includes the pair of oscillators 40 and the signal amplifier 22. The electrical signal flows between the pair of oscillators 40 via the signal amplifier 22 due to the self-excited oscillation, and further, the ultrasonic wave is generated in the flow channel unit 30. Accordingly, the suspension processing unit 3A automatically exhibits the action of the suspension processing using the ultrasonic wave without receiving a predetermined waveform signal from outside.

In the above-described ON state, the electrical signal is automatically excited via the signal amplifier 22 and a weak current flows at first between the pair of oscillators 40, and then, the signal is amplified through the signal amplifier 22. The electrical signal E2 from the second oscillator 40b is input to the signal amplifier 22, and the amplified electrical signal E1 is input to the first oscillator 40a. The electrical signals E1 and E2 become alternating waveforms corresponding to the self-excited oscillation. The electrical signal E1 is a signal generated by the self-excited oscillation, and the configuration of the present embodiment is different from a configuration in which a waveform signal generated by a conventional waveform generator is applied to an oscillator.

It is possible for the user to control a state of the suspension processing by the operation of the switch 21 according to the configuration in which the switch 21 is provided in the drive control unit 2. Note that a mode, in which the switch 21 is not provided, but is substituted by a switch or the like that the signal amplifier 22 directly includes, may be possible.

The signal amplifier 22 is a circuit unit that amplifies the input electrical signal E2, and outputs the amplified signal as the electrical signal E1. An output end side of the signal amplifier 22 is connected to the electrode of first oscillator 40a through the conducting wire, and an input end side thereof is connected to the electrode of the second oscillator 40b through the conducting wire via the switch 21. Further, the output end of the signal amplifier 22 is connected to the signal detector 23. Further, the output control unit 24 is connected to the signal amplifier 22. A well-known amplifier circuit such as a negative feedback amplifier circuit may be applied as the signal amplifier 22.

The signal detector 23 is an oscilloscope or the like that detects and measures the output electrical signal E1 and displays the waveform. It is possible to allow the user to confirm the states of the electrical signal E1 and the suspension processing according to the configuration in which the signal detector 23 is provided.

The output control unit 24 controls a magnitude of the electrical signal E1 output from the signal amplifier 22 to fall within a predetermined range or a predetermined upper limit value. The output control unit 24 controls an amplification level and the like of the signal amplifier 22 so as to control such a maximum output.

It is possible to allow the circuit to generate the self-excited oscillation when the switch 21 in the drive control unit 2 is turned on. At such an ON time, however, the circuit is assumed that the signal is excited to the maximum output almost instantaneously due to the action of amplification of the signal amplifier 22. Thus, the output control unit 24 is provided in the drive control unit 2 as an output control means for controlling the maximum output in relation to the self-excited oscillation. Note that the output control unit 24 may be built in the signal amplifier 22 and the like. It is possible to adjust intensity of the suspension processing using the ultrasonic wave of the suspension processing unit 3A by the output control unit 24.

Furthermore, the output control unit 24 may be provided with a function of controlling a frequency of the electrical signal E1 output from the signal amplifier 22. Accordingly, it is possible to control a characteristic of the sound field caused by the ultrasonic wave generated by the oscillator 40, and to adjust a characteristic of the capture of the solids in the suspension 51. It is possible to suitably control the suspension processing according to the configuration in which the output control unit 24 is provided.

[Suspension Processing]

Figure 3:
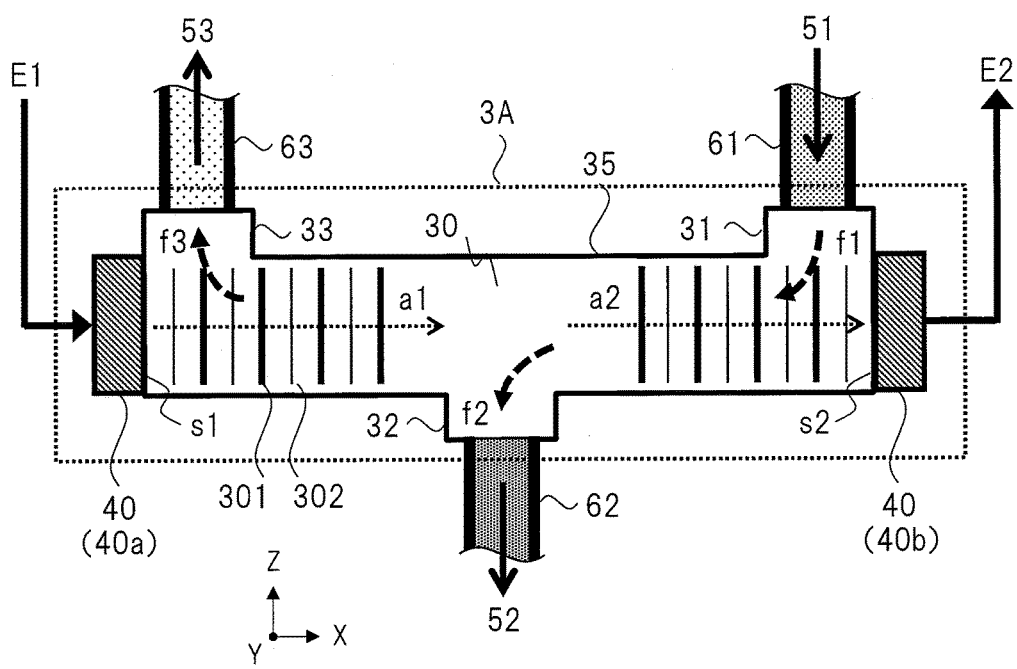
FIG. 3 is a diagram illustrating an operation principle relating to the ultrasonic wave of the suspension processing unit of FIG. 2 in the XZ cross-section.

FIG. 3 illustrates an explanatory diagram that relates to the suspension processing including an operation principle relating to the ultrasonic wave generated by the oscillator 40 of the suspension processing unit 3A of FIG. 2. As described above, the electrical signals E1 and E2 flow due to the self-excited oscillation of the circuit caused by the pair of oscillators 40 and the signal amplifier 22 according to the ON state of the switch 21. Further, the ultrasonic wave is generated in the flow channel unit 30 between the first oscillator 40a and the second oscillator 40b, and a strong sound field is formed by the ultrasonic wave. The sound field formed by the ultrasonic wave is a standing wave sound field according to a natural frequency of the oscillator 40.

The first oscillator 40a converts the electrical signal E1 to be input from the signal amplifier 22 into the ultrasonic wave caused by oscillation of the oscillating surface s1, and emits the ultrasonic wave toward the right side in the X direction inside the flow channel unit 30 like a1. The first oscillator 40a emits the ultrasonic wave in the natural frequency. The ultrasonic wave from the first oscillator 40a is transmitted to the right side in the X direction inside the flow channel unit 30, and reaches the second oscillator 40b like a2. The second oscillator 40b converts oscillation of the ultrasonic wave to be received by the oscillating surface s2 into the electrical signal E2, and outputs the converted signal to the signal amplifier 22 via the switch 21.

As illustrated in FIG. 3, a node 301, which is a region with high sound pressure, and an antinode 302, which is a region with low sound pressure, cyclically appear along the X direction according to the natural frequency of the oscillator 40 in the strong sound field to be formed in the X direction of the long axis in the flow channel unit 30. Note that images of some of the nodes 301 and the antinodes 302 in the sound field are schematically illustrated in FIG. 3.

In a case in which the solids sufficiently small in comparison with intervals between the antinodes 302 and the nodes 301 are present in the suspension 51 as a medium inside the flow channel unit 30 upon the formation of the sound field by the ultrasonic wave in the flow channel unit 30, the solids are captured. That is, the solids receive forces toward the antinodes 302 or the nodes 301 of the sound field according to physical property values of the solids, and accordingly, the solids are captured at the positions of the antinodes 302 or the nodes 301. The captured solids are flocculated due to intermolecular forces. The above-described position of the capture is included in the entire portion in the X direction in which the sound field is formed in the flow channel unit 30.

The captured and flocculated solids described above settle toward the bottom portion on the lower side in the Z direction due to the own weights, when having a certain size. Further, the settling solids receive a force to be conveyed toward the left side in the X direction in response to the flow of the suspension 51 toward the left side in the X direction in the flow channel unit 30. Further, the direction of the ultrasonic wave is the rightward X direction like a1 and a2, and accordingly, the settling solids also receive a force to be conveyed to the right side in the X direction. The above-described position of settling depends on a flow rate in the flow channel unit 30 or a characteristic of the suspension 51 as well as each design of the flow channel unit 30, the oscillator 40 and the like in detail.

Further, the processing liquid that contains a large number of solids to settle on the bottom portion of the flow channel unit 30 is discharged as the concentrate liquid 52 from the concentrate port 32 like f2. Further, the processing liquid flowing toward the left side in the X direction other than the concentrate liquid 52 is discharged as the clear liquid 53 from the outlet port 33 at the left end in the X direction like f3. A position of the concentrate port 32 in the bottom portion of the flow channel unit 30 can be any position in the X direction, but is particularly provided at the position in the vicinity of the middle in the X direction on consideration of the above-described position of settling of the solids or the like.

According to the suspension processing using the ultrasonic wave described above, it is possible to separate the suspension 51, to be supplied into the flow channel unit 30 from the supply port 31, into the concentrate liquid 52 and the clear liquid 53. That is, it is possible to selectively and efficiently recover and discharge the concentrate liquid 52 that contains a large number of solids from the concentrate port 32, and further, possible to selectively and efficiently recover and discharge the clear liquid 53, other than the concentrate liquid 52, from the outlet port 33.

[Effect and the Like]

Figure 4:
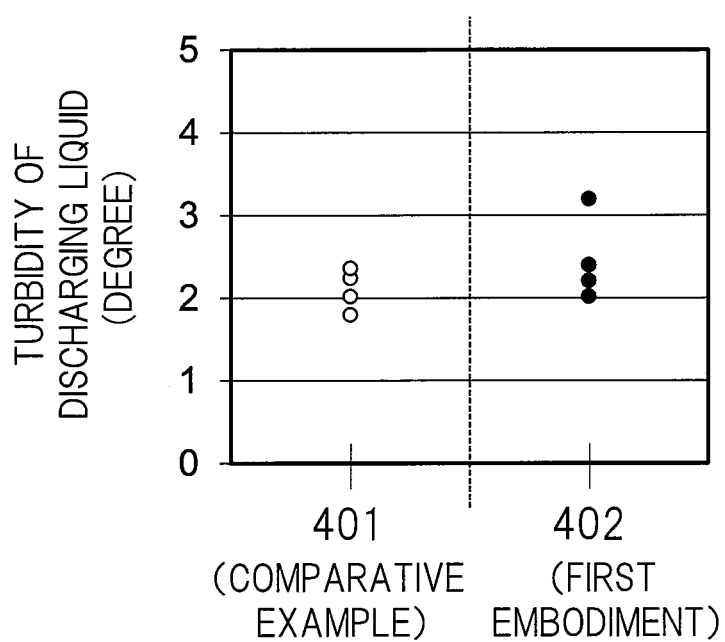
FIG. 4 is a diagram illustrating an effect of suspension processing using the suspension processing device of the first embodiment in comparison with a comparative example.

A description will be given regarding a processing performance, an effect and the like in the suspension processing using the suspension processing device 1A of the first embodiment with reference to FIG. 4. FIG. 4 illustrates the effect of the suspension processing using the suspension processing device 1A of the first embodiment in comparison with a comparative example, and illustrates a result evaluated in terms of turbidity of the discharging liquid as a result of processing a sample liquid of the suspension according to the first embodiment and the comparative example. Reference numeral 401 represents the result obtained using a suspension processing device of the comparative example with respect to the first embodiment. Reference numeral 402 represents the result obtained using the suspension processing device 1A of the first embodiment. A vertical axis of FIG. 4 indicates the turbidity of the sample liquid of the discharging liquid that corresponds to the clear liquid 53.

The processing performance of the suspension processing device 1A of the first embodiment, which corresponds to 402, was evaluated by supplying the sample liquid of the suspension 51 from the supply port 31 of the suspension processing unit 3A, and using the turbidity of the sample liquid of the clear liquid 53 as the discharging liquid to be discharged from the outlet port 33. Suspension with the turbidity of 16 to 18 degrees in which alumina particles having an average particle diameter of 53 micrometers were dispersed in pure water was used as the sample liquid of the suspension 51 used in this evaluation. An ultrasonic oscillator with a resonance frequency, which corresponds to the natural frequency, of 2.01 MHz was used as the oscillator 40 used in this evaluation.

The suspension processing device of the comparative example, which corresponds to 401, has the following configuration. The suspension processing device of the comparative example has a suspension processing unit, in which an ultrasonic oscillator and a reflection plate made of aluminum are arranged as a pair through a flow channel unit, and a circuit of a drive control unit to be connected to the ultrasonic oscillator. The drive control unit includes a function generator as a waveform generator that generates a waveform signal for control to be applied to the ultrasonic oscillator, and a circuit such as a power amplifier that amplifies the waveform signal. The suspension processing unit is arranged such that the ultrasonic oscillator and the reflection plate, as the pair, oppose each other in parallel in a direction orthogonal to a flowing direction of the suspension inside the flow channel unit. The waveform signal from the waveform generator is a waveform signal according to AC voltage having a predetermined frequency.

The suspension processing unit of the comparative example is a system to generate the ultrasonic wave using oscillation from the ultrasonic oscillator by applying the waveform signal from the circuit that includes the external waveform generator to the ultrasonic oscillator. The ultrasonic wave emitted from the ultrasonic oscillator passes through the flow channel unit and is reflected by the reflection plate. A sound field is formed by the ultrasonic wave between the ultrasonic oscillator and the reflection plate. Then, a fine object, solids, or the like in the suspension is captured in the sound field. A discharging liquid containing a large number of captured materials is discharged from one outlet port of the flow channel unit, and a discharging liquid, other than the former discharging liquid, is discharged from the other outlet port.

Since the system of the comparative example requires the input of the waveform signal to the ultrasonic oscillator at the time of driving the suspension processing unit, it is necessary to provide the function generator and the like which is the waveform generator as the circuit of the drive control unit. Thus, the comparative example requires power consumption for driving of the circuit.

It seems that 402 of FIG. 4, which is the result of the first embodiment, has no big difference as compared to 401, which is the result of the comparative example, in terms of the turbidity of the discharging liquid. That is, it is possible to obtain the processing performance, substantially the same as that of the comparative example, in the suspension processing according to the first embodiment.

As described above, the suspension processing device 1A of the first embodiment, which corresponds to 402, is the system that generates the ultrasonic wave using the self-excited oscillation caused by the circuit in which the pair of oscillators 40 and the signal amplifier 22 is connected to each other. Basically, driving by the self-excited oscillation is possible only using the signal amplifier 22 as the circuit of the drive control unit 2. The system of the comparative example is not a system using the self-excited oscillation. It is not necessary to provide the circuit such as the waveform generator in the drive control unit 2 to apply the waveform signal to the oscillator 40. Since the circuit configuration of the first embodiment is simplified as compared to that of the comparative example, it is possible to suppress the power consumption.

As above, it is possible to maintain substantially the same processing performance as that of the comparative example and reduce the power consumption at the time of driving the suspension processing according to the first embodiment. It is possible to efficiently emit the ultrasonic wave between the oscillators 40, and efficiently generate the self-excited oscillation of the circuit by oppositely arranging the oscillating surface s1 of the first oscillator 40a and the oscillating surface s2 of the second oscillator 40b. It is possible to realize the efficient suspension processing by each action of the flow in the flow channel unit 30, gravity, and the ultrasonic wave, and to efficiently obtain the concentrate liquid 52 and the clear liquid 53, according to the configuration in which the supply port 31, the concentrate port 32, the outlet port 33, and the pair of oscillators 40 are provided at the suitable positions in the tubular structure body 35A of the flow channel unit 30.

Modification Examples

The following modification examples can be obtained from the first embodiment.

(1) The direction of the ultrasonic wave of the flow channel unit 30 has been set to the rightward X direction, which is opposite to the leftward X direction along which the suspension 51 flows, like a1 and a2 in response to the input and output of the electrical signals E1 and E2 of the pair of oscillators 40 in the first embodiment. The invention is not limited thereto, and the direction of the ultrasonic wave may be set to be the same as the leftward X direction along which the suspension 51 flows by arranging the second oscillator 40b and the first oscillator 40a at the left end side and the right end side, respectively, in the X direction, which corresponds to the long axis of the flow channel unit 30, as a modification example of the first embodiment.

(2) The position of the concentrate port 32 to be provided in the tubular structure body 35A of the suspension processing unit 3A has been set to the position in the vicinity of the middle in the X direction in the first embodiment. The position of the concentrate port 32 may be set to any position determined depending on the flow rate in the flow channel unit 30, the characteristic of the suspension 51 or the like between both the right and left ends in the X direction which is the region in which the suspension 51 flows, as a modification example of the first embodiment. For example, the position of the concentrate port 32 may be set to a position closer to the supply port 31 on the right side in the X direction than the center in the X direction, or may be set to a position closer to the outlet port 33 on the left side in the X direction.

(3) Each of the positions of the supply port 31 and the outlet port 33 may be set to a position so as to be opened in the Y direction on the side surface along the long axis of the tubular structure body 35A as a modification example of the first embodiment. Further, two or more of the supply ports 31 or two or more of the outlet ports 33 may be provided in the flow channel unit 30. Further, two or more of the concentrate ports 32 may be provided in the bottom portion of the flow channel unit 30.

(4) The suspension processing unit 3A may have three or more of the oscillators 40 provided in the flow channel unit 30 as a modification example of the first embodiment. When the two oscillators 40 are arranged, it is desirable to oppositely arrange the oscillators on one straight line. However, the invention is not necessarily limited thereto, and the two oscillators 40 may be arranged such that directions of central axes of the oscillating surfaces are deviated from each other depending on shapes or the like of the tubular structure body 35A and the flow channel. A plurality of pairs of the oscillators 40, the single pair including two oscillators, may be provided in the flowing direction of the suspension 51 or a direction orthogonal to the flowing direction in the flow channel unit 30. For example, two pairs of the oscillators 40 may be arranged in parallel in the X direction. For example, one pair of the oscillators 40 may be arranged in the X direction, and the other pair of the oscillators 40 may be arranged in the Z direction.

Second Embodiment

Figure 5:
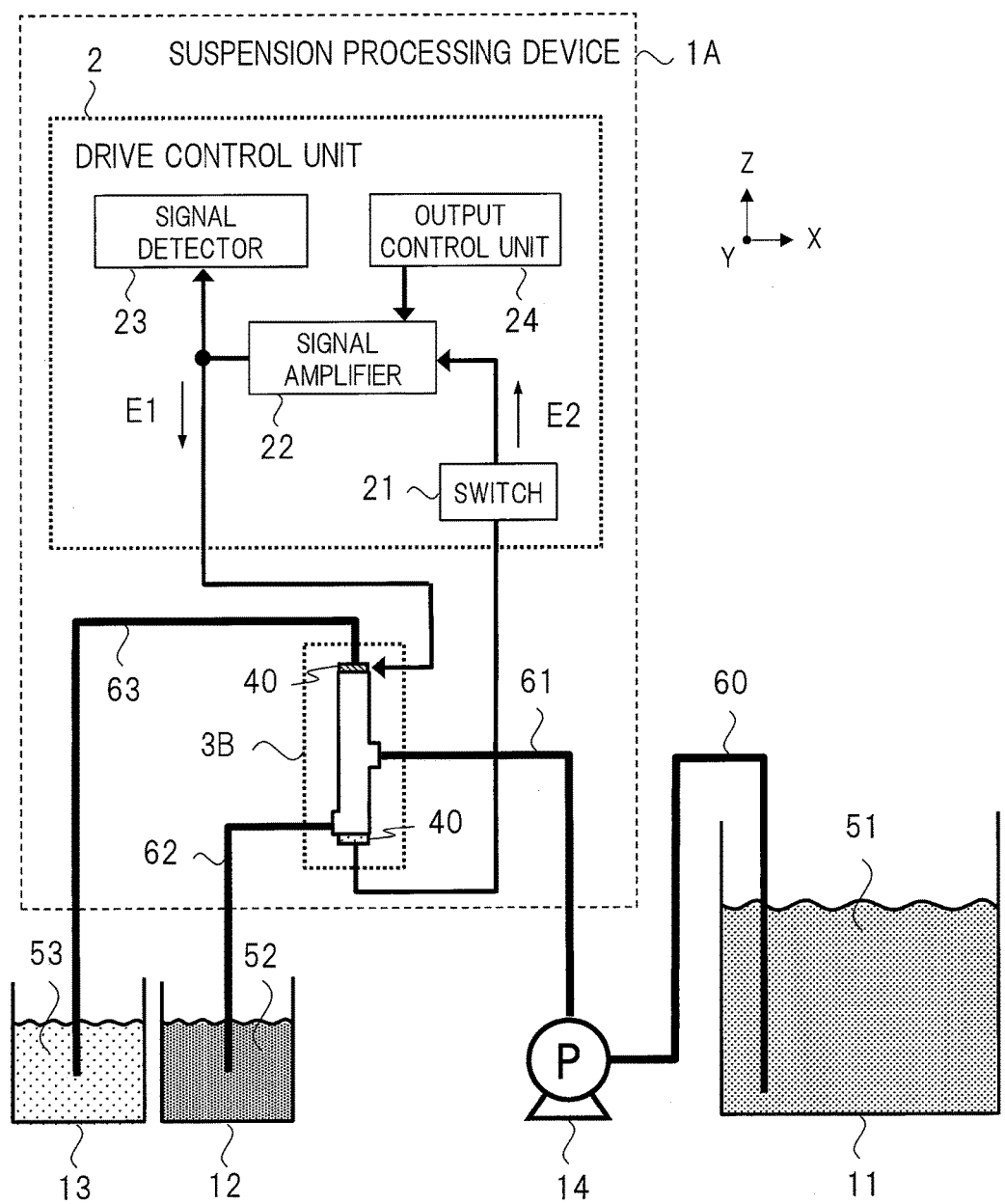
FIG. 5 is a diagram illustrating a configuration of a system that includes a suspension processing device using an ultrasonic wave according to a second embodiment of the present invention.

Next, a description will be given regarding a suspension processing device using an ultrasonic wave according to a second embodiment of the present invention with reference to FIGS. 5 to 7. FIG. 5 illustrates a configuration of a system that includes a suspension processing device 1B of the second embodiment. The suspension processing device 1B of the second embodiment has a suspension processing unit 3B as a component mainly different from the suspension processing device 1A of the first embodiment. The configurations other than the suspension processing unit 3B are substantially the same as those of the first embodiment.

Figure 6:
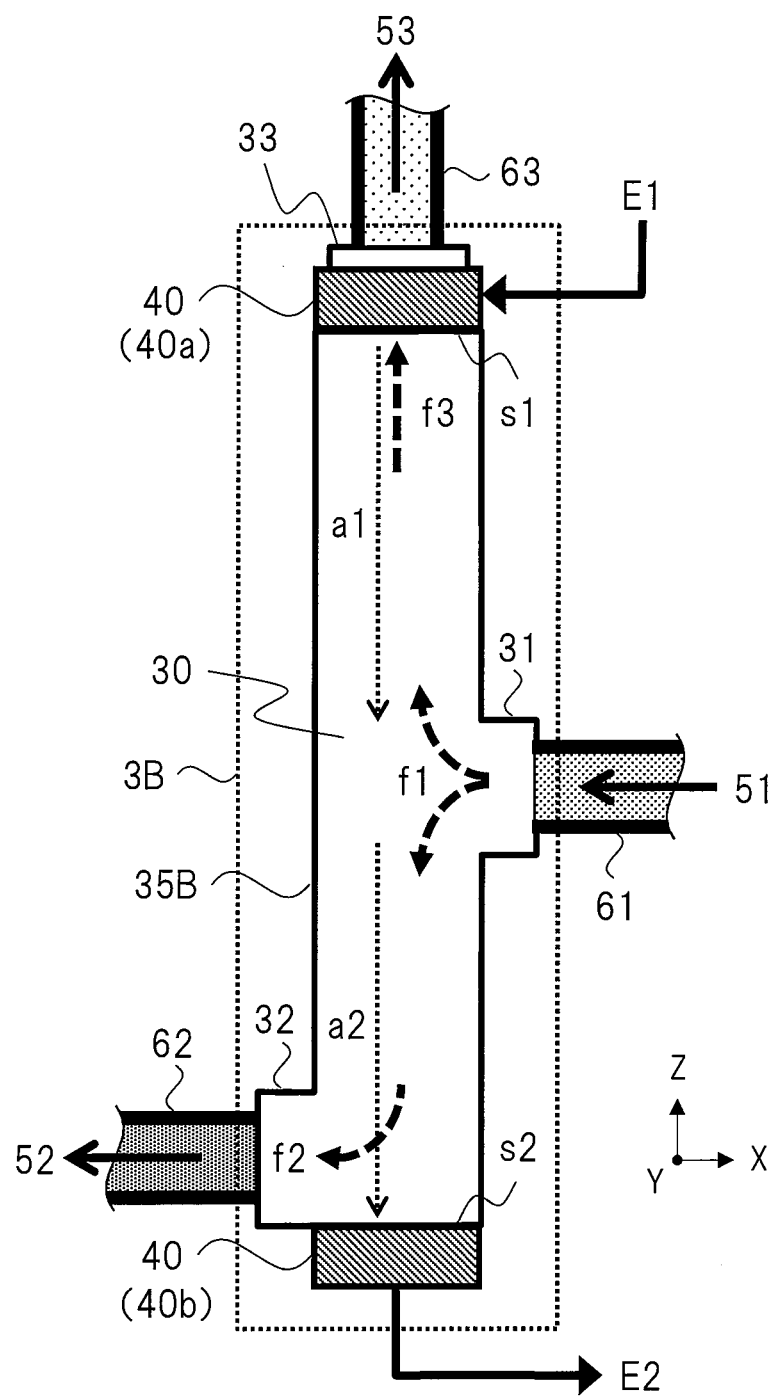
FIG. 6 is a diagram illustrating a structure of a suspension processing unit of the suspension processing device of the second embodiment in an XZ cross-section.

FIG. 6 illustrates a structure, flow, and the like of the suspension processing unit 3B in the suspension processing device 1B of the second embodiment in the XZ cross-section. The suspension processing unit 3B has the flow channel unit 30 configured of a tubular structure body 35B, and the first oscillator 40a and the second oscillator 40b as the pair of oscillators 40. The supply port 31 of the suspension 51, the concentrate port 32 of the concentrate liquid 52, and the outlet port 33 of the clear liquid 53 are provided in the flow channel unit 30.

The flow channel unit 30 configured of the tubular structure body 35B is arranged so as to have the long axis in the Z direction, and the short axis in the X direction and the Y direction, as illustrated in FIG. 6. The XY cross-section of the tubular structure body 35B has a circular shape, for example.

The supply port 31 is arranged to be opened in the rightward X direction at a position in the vicinity of the middle in the Z direction on a side surface along the long axis of the tubular structure body 35B, and is connected to an end portion in the leftward X direction of the liquid feed tube 61. The concentrate port 32 is arranged to be opened in the leftward X direction at a position of a lower end in the Z direction on the side surface of the tubular structure body 35B, and is connected to an end portion in the rightward X direction of the liquid feed tube 62. The outlet port 33 is arranged to be opened in the upward Z direction at a position of an upper end in the Z direction of the tubular structure body 35B, and is connected to an end portion in the downward Z direction of the liquid feed tube 63.

The first oscillator 40a and the second oscillator 40b as the pair of oscillators 40 are provided such that the respective oscillating surfaces thereof oppose each other in parallel at both the upper and lower ends in the Z direction so as to sandwich substantially the entire region of the flow channel unit 30 in the Z direction which is the long axis of the flow channel unit 30. The oscillating surface s1 of the first oscillator 40a is arranged so as to be exposed to the inside of the flow channel unit 30 in the XY plane of the flow channel unit 30 at the upper end in the Z direction. The oscillating surface s2 of the second oscillator 40b is arranged so as to be exposed to the inside of the flow channel unit 30 in the XY plane of the flow channel unit 30 at the lower end in the Z direction.

There is flow like f1, f2 or f3 in the flow channel unit 30 as flow of the suspension 51 and the like. The suspension 51 flowing into the flow channel unit 30 from the supply port 31 flows in the flow channel unit 30 in the state of being split into the upper side and the lower side in the Z direction like f1. One flow of f1 flows to the lower side in the Z direction like f2 and is discharged as the concentrate liquid 52 from the concentrate port 32. The other flow of f1 flows to the upper side in the Z direction like f3 and is discharged as the clear liquid 53 from the outlet port 33.

A flowing direction of the suspension 51 is changed from the leftward X direction toward the upper and lower sides in the Z direction like f1, between in the liquid feed tube 61 and in the flow channel unit 30. A flowing direction of the concentrate liquid 52 is changed from the downward Z direction to the leftward X direction like f2, between in the flow channel unit 30 and in the liquid feed tube 62. A flowing direction of the clear liquid 53 is the same as the upward Z direction like f3, between in the flow channel unit 30 and in the liquid feed tube 63.

In the second embodiment, the solids are captured by action of the ultrasonic wave from the flowing suspension 51 in the flow channel unit 30 having the long axis in the Z direction. The captured solids settle toward the lower side in the Z direction by their own weight due to flocculation. Accordingly, a large number of solids are collected at the bottom portion on the lower side in the Z direction in the flow channel unit 30. In correspondence with this, the concentrate port 32 of the flow channel unit 30 is provided at a position in the vicinity of the bottom portion on the lower side in the Z direction, and the outlet port 33 is provided at a position on the upper side in the Z direction.

The flow channel unit 30 configured of the tubular structure body 35B has the outlet port 33 and the concentrate port 32, which are provided to be separated from each other at both the upper and lower ends in the Z direction corresponding to the arrangement of the pair of oscillators 40, and has the supply port 31 which is provided at the position in the vicinity of the middle in the Z direction. The concentrate port 32 is arranged at a neighboring upper left side in the vicinity of the second oscillator 40b at the lower end in the Z direction on the lower side in the Z direction of the side surface of the tubular structure body 35B. The outlet port 33 is arranged at the same position as the second oscillator 40b in the XY plane at the upper end in the Z direction of the tubular structure body 35B. Thus, the first oscillator 40a has an opening portion 70 as illustrated in FIG. 7 to be described later.

The pair of oscillators 40 is electrically connected to each other via the signal amplifier 22 similarly to the first embodiment. The first oscillator 40a inputs the electrical signal E1 from the signal amplifier 22 and emits the ultrasonic wave like a1 into the flow channel unit 30. The second oscillator 40b receives the ultrasonic wave like a2 from the inside of the flow channel unit 30, converts the received ultrasonic wave into the electrical signal E2, and outputs the converted signal to the signal amplifier 22.

Figure 7A:
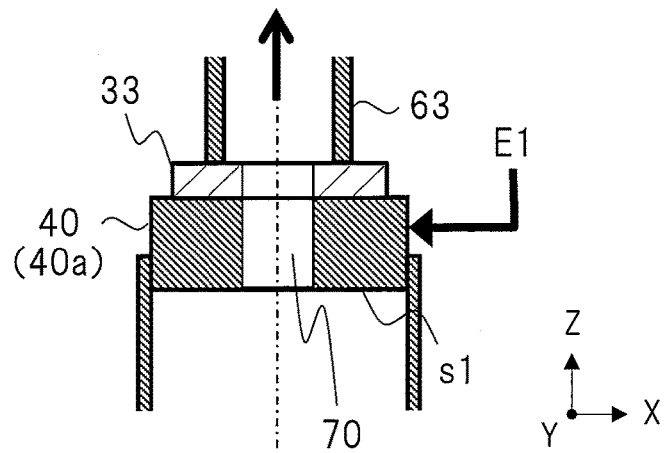
FIGS. 7A-7C are diagrams illustrating a structure in the vicinity of a first oscillator and an outlet port of the suspension processing unit of the second embodiment.
Figure 7B:
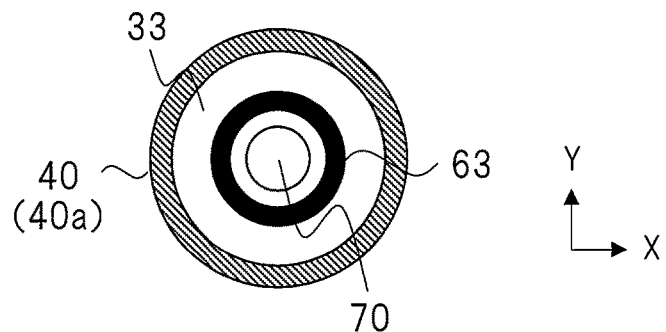
Figure 7C:
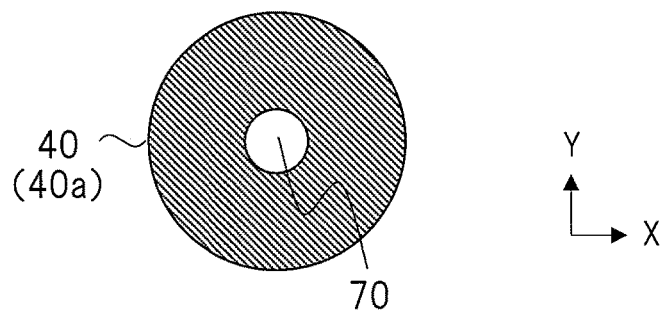

FIG. 7 illustrates an exemplary structure in the vicinity of the outlet port 33 and the first oscillator 40a in an upper part in the Z direction of the suspension processing unit 3B of FIG. 6. FIG. 7(a) schematically illustrates a diagram seen in the XZ cross-section, FIG. 7(b) schematically illustrates a diagram seen from the upper side in the Z direction of the XY plane, and FIG. 7(c) schematically illustrates a diagram seen from the lower side in the Z direction of the XY plane.

As illustrated in FIG. 7(a), the tubular structure body 35B, the first oscillator 40a, the outlet port 33, and the liquid feed tube 63 are arranged in this order from the lower side in the Z direction, and are connected to each other. As illustrated in FIGS. 7(a) to 7(c), the opening portion 70 is provided at a circular center of the XY plane. The first oscillator 40a to be arranged at the upper part in the Z direction of the flow channel unit 30 has the opening portion 70 at the center inside the XY plane that includes the oscillating surface s1. The opening portion 70 is also provided corresponding to the outlet port 33. The inside of the flow channel unit 30 and the liquid feed tube 63 communicate with each other in the Z direction through the opening portion 70.

In the configuration of FIG. 7(a), an outer peripheral portion of the oscillating surface s1 of the first oscillator 40a is fixed to the side surface of the tubular structure body 35B on the upper surface in the Z direction of the flow channel unit 30, and the oscillating surface s1 of the first oscillator 40*a* is arranged so as to be exposed to the inside of the flow channel unit 30. However, the invention is not limited thereto, and a mode, in which the oscillating surface s1 of the first oscillator 40*a* is provided in contact with an outer side of the upper surface of the flow channel unit 30 may be possible similarly to the above description. A shape of the XY plane of the oscillator 40 is set to the circular shape in accordance with the cross-sectional shape of the tubular structure body 35B, but can be set to a rectangular shape or the like without being limited thereto.

A description will be given regarding suspension processing including the action of the ultrasonic wave according to the oscillator 40 of the suspension processing unit 3B with reference to FIG. 6. Similarly to the first embodiment, in the ON state of the switch 21 of the drive control unit 2, the electrical signals E1 and E2 flow due to the self-excited oscillation in the circuit of the pair of oscillators 40 and the signal amplifier 22, and the ultrasonic wave is generated like a1 and a2 between the oscillators 40. Accordingly, a strong sound field is formed according to the natural frequency of the oscillator 40 in the flow channel unit 30 of the suspension processing unit 3B.

The suspension 51 from the supply port 31 passes through the flow channel unit 30 in which the sound field is formed like f1. The solids in the suspension 51 flowing in the flow channel unit 30 are captured at positions of antinodes and nodes in the sound field. The captured material settles toward the bottom portion on the lower side in the Z direction in the flow channel unit 30 by the own weight due to the flocculation. Accordingly, a processing liquid containing a large number of sediments is discharged from the concentrate port 32 in the vicinity of the bottom portion of the flow channel unit 30 as the concentrate liquid 52 like f2. Further, a processing liquid other than the concentrate liquid 52 is discharged from the outlet port 33 at the upper part of the flow channel unit 30 as the clear liquid 53 like f3.

As above, since the circuit such as the waveform generator is not required according to the second embodiment, similar to the first embodiment, it is possible to reduce the power consumption at the time of driving the suspension processing.

As a modification example of the second embodiment, the direction of the ultrasonic wave may be set to the upward Z direction by arranging the second oscillator 40*b* and the first oscillator 40*a* at the upper end side and the lower end side, respectively, in the Z direction which corresponds to the long axis of the flow channel unit 30.

As a modification example of the second embodiment, the outlet port 33 of the flow channel unit 30 may be arranged to be opened in the X direction or the Y direction at the position in the vicinity of the first oscillator 40*a* on the side surface of the tubular structure body 35B similarly to the configuration of the concentrate port 32 described above. Further, the concentrate port 32 of the flow channel unit 30 may be arranged to be opened in the downward Z direction at the same position as the second oscillator 40*b* having the opening portion similarly to the configuration of the outlet port 33 described above.

Further, as a modification example of the first embodiment described above, the first oscillator 40*a* and the outlet port 33, each of which has an opening portion on a left end surface in the X direction, may be provided at the same positions similarly to the configurations of the first oscillator 40*a* and the outlet port 33 each of which has the opening portion 70 according to the second embodiment. Further, the second oscillator 40*b* and the supply port 31, each of which has an opening portion on a right end surface in the X direction, may be provided at the same positions.

Third Embodiment

Next, a description will be given regarding a suspension processing device using an ultrasonic wave according to a third embodiment of the present invention with reference to FIGS. 8 to 9. The third embodiment has a suspension processing unit 3C as a component mainly different from the first embodiment.

Figure 8:
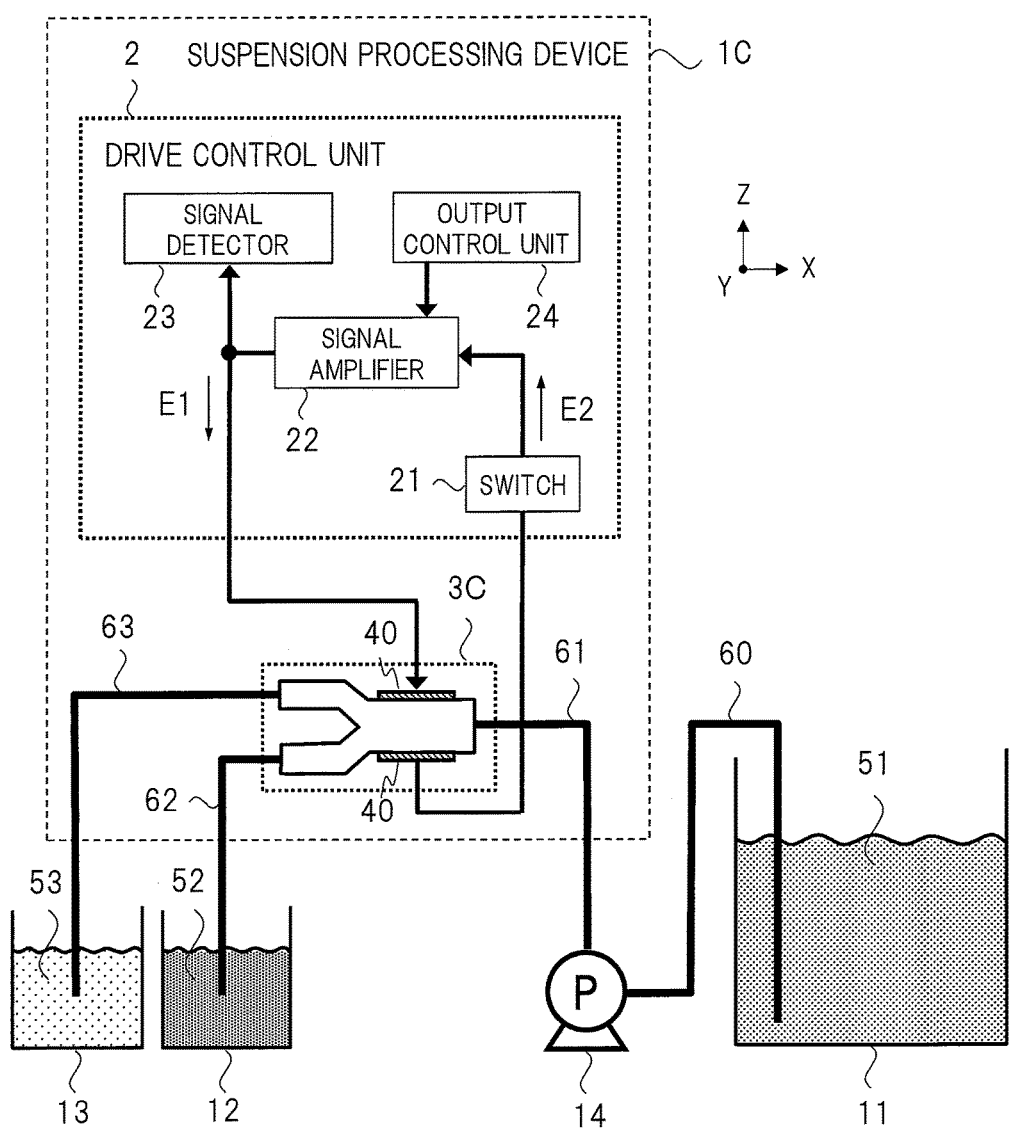
FIG. 8 is a diagram illustrating a configuration of a system that includes a suspension processing device using an ultrasonic wave according to a third embodiment of the present invention.

FIG. 8 illustrates a configuration of a system that includes a suspension processing device 1C of the third embodiment. The suspension processing device 1C of the third embodiment has the suspension processing unit 3C as a component mainly different from the suspension processing device 1A of the first embodiment. The configurations other than the suspension processing unit 3C are substantially the same as those of the first embodiment.

Figure 9:
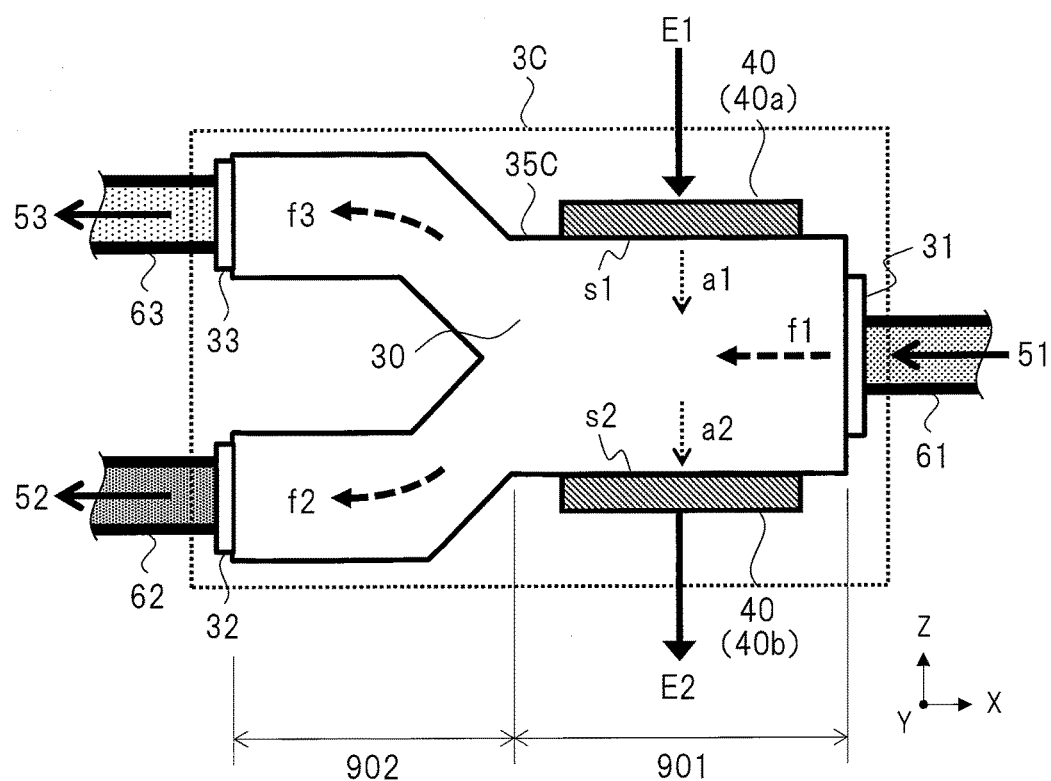
FIG. 9 is a diagram illustrating a structure of a suspension processing unit of the suspension processing device of the third embodiment in an XZ cross-section.

FIG. 9 illustrates a structure, flow, and the like of the suspension processing unit 3C in the suspension processing device 1C of the third embodiment in the XZ cross-section. The suspension processing unit 3C has the flow channel unit 30 configured of a tubular structure body 35C, and the first oscillator 40*a* and the second oscillator 40*b* as the pair of oscillators 40. The supply port 31 of the suspension 51, the concentrate port 32 of the concentrate liquid 52, and the outlet port 33 of the clear liquid 53 are provided in the flow channel unit 30.

The flow channel unit 30 configured of the tubular structure body 35C is arranged such that a flow channel flowing toward the left side in the X direction is basically formed as illustrated in FIG. 9. A single flow channel toward the left side in the X direction is formed in an upstream region 901 on the right side in the X direction of the flow channel unit 30. A flow channel unit having a shape of two branches is formed at a downstream region 902 on the left side in the X direction of the flow channel unit 30. The YZ cross-section of the upstream region 901 of the tubular structure body 35C has a rectangular shape, for example.

The supply port 31 opened in the X direction is provided in the YZ plane at a right end in the X direction in the upstream region 901 of the flow channel unit 30, and is connected to an end portion in the leftward X direction of the liquid feed tube 61.

One branch extends toward the lower side in the Z direction and the left side in the X direction, and the other branch extends toward the upper side in the Z direction and in the left side in the X direction in the downstream region 902 of the flow channel unit 30. The one branch is provided at a left end surface in the X direction at which the concentrate port 32 as the first outlet port is arranged to be opened in the X direction, and the concentrate port 32 is connected to an end portion in the rightward X direction of the liquid feed tube 62. The other branch is provided at the left end surface in the X direction at which the outlet port 33 as the second outlet port is arranged to be opened in the X direction, and the outlet port 33 is connected to an end portion in the rightward X direction of the liquid feed tube 63.

The pair of oscillators 40 is arranged in the XY plane at both upper and lower ends in the Z direction of a side surface of the tubular structure body 35C so as to sandwich the flow channel unit of the region 901 at the upstream side, which is not branched, in the Z direction. Oscillating surfaces of the pair of oscillators 40 are arranged so as to oppose each other on a straight line in the Z direction which is orthogonal to the X direction along the flow of the upstream region 901. The oscillating surface s1 of the first oscillator 40a and the oscillating surface s2 of the second oscillator 40b oppose each other in parallel in the XY plane toward the inside of the flow channel unit 30. For example, the oscillating surface s1 of the first oscillator 40a is exposed to the inner side of the XY plane on the upper side in the Z direction of the tubular structure body 35C in the upstream region 901, and the oscillating surface s2 of the second oscillator 40b is exposed to the inner side of the XY plane on the lower side in the Z direction.

There is flow like f1, f2 or f3 in the flow channel unit 30 as flow of the suspension 51 and the like. The suspension 51 flowing into the flow channel unit 30 from the supply port 31 flows toward the left side in the X direction in the flow channel unit 30 like f1, and then is branched like f2 and f3. One flow of f1 flows toward the lower side in the Z direction and the left side in the X direction like f2 and is discharged as the concentrate liquid 52 from the concentrate port 32. The other flow of f1 flows toward the upper side in the Z direction and the left side in the X direction like f3 and is discharged as the clear liquid 53 from the outlet port 33.

In the third embodiment, the solids, which are captured by action of the ultrasonic wave from the suspension 51 flowing in the upstream region 901, settle toward the lower side in the Z direction by their own weight due to flocculation in the flow channel unit 30 which flows along the X direction, and proceeds toward the downstream region 902 by the flow toward the left side in the X direction. Accordingly, a large number of solids are collected at a branch region side toward the lower side in the Z direction in the downstream region 902. In correspondence with this, the concentrate port 32 is provided at the branch region side on the lower side in the Z direction of the flow channel unit 30, and the outlet port 33 is provided at a branch region side on the upper side in the Z direction.

Similarly to the first embodiment, the pair of oscillators 40 is electrically connected to each other via the signal amplifier 22. The first oscillator 40a inputs the electrical signal E1 from the signal amplifier 22 and emits the ultrasonic wave like a1 into the flow channel unit 30. The second oscillator 40b receives the ultrasonic wave like a2 from the inside of the flow channel unit 30, converts the received ultrasonic wave into the electrical signal E2, and outputs the converted signal to the signal amplifier 22.

A description will be given regarding suspension processing that includes the action of the ultrasonic wave according to the oscillator 40 of the suspension processing unit 3C with reference to FIG. 9. Similarly to the first embodiment, in the ON state of the switch 21 of the drive control unit 2, the electrical signals E1 and E2 flow due to the self-excited oscillation in the circuit of the pair of oscillators 40 and the signal amplifier 22, and the ultrasonic wave is generated like a1 and a2 between the oscillators 40. Accordingly, a strong sound field is formed according to the natural frequency of the oscillator 40, particularly in the upstream region 901 in the flow channel unit 30 of the suspension processing unit 3C.

The suspension 51 from the supply port 31 passes through the sound field inside the upstream region 901 like f1, and the solids in the suspension 51 are captured at positions of antinodes or nodes of the sound field. The captured material settles toward the bottom portion on the lower side in the Z direction in the flow channel unit 30 by the own weight due to the flocculation. In addition, the sediment is conveyed to the downstream region 902 by the flow toward the left side in the X direction in the flow channel unit 30 in the course of settling. Processing liquids are split into the upper and lower branch regions in the Z direction like f2 and f3 in the downstream region 902. The processing liquid that contains a lot of sediments proceeds to the branch region on the lower side in the Z direction like f2, and is discharged as the concentrate liquid 52 from the concentrate port 32 provided at a tip of the branch on the lower side in the Z direction. Further, the processing liquid proceeding to the branch at the upper side in the Z direction like f3 is discharged as the clear liquid 53 from the outlet port 33 provided at a tip of the branch.

As above, since the circuit such as the waveform generator is not required according to the third embodiment, similar to the first embodiment, it is possible to reduce the power consumption at the time of driving the suspension processing.

As a modification example of the third embodiment, the pair of oscillators 40 may be provided in contact with each outer side of upper and lower surfaces in the Z direction of the side surface of the tubular structure body 35C in the upstream region 901.

As a modification example of the third embodiment, the YZ cross-section of the upstream region 901 of the tubular structure body 35C may have a circular shape. In such a case, the pair of oscillators 40 may be a flat plate having a rectangular shape in the XY plane similarly to the above description, or may be a curved plate which is curved along a shape of the side surface of the tubular structure body 35C. The action of the suspension processing is maintained in either mode (that is, either a flat plate or a curved plate) as long as the ultrasonic wave is transmitted via a medium of the flow channel unit 30 between the pair of oscillators 40.

As a modification example of the third embodiment, the supply port 31, the concentrate port 32 and the outlet port 33 of the flow channel unit 30 may be provided in various directions such as the Z direction or the Y direction in accordance with the shape of the tubular structure body 35C and the flow of the suspension 51 without being limited to the arrangement of being opened in the leftward X direction.

As a modification example of the third embodiment, a shape of the branch of the flow channel unit 30 is not limited to the shape of FIG. 9, which has two branches, but may have three or more branches. Further, outlet ports may be provided respectively in the plurality of branch regions.

As a modification example of the third embodiment, the branch may not be provided in the downstream region 902, and the concentrate port 32 may be provided at a position in the middle of the X direction and the outlet port 33 may be provided at the left end in the X direction similarly to the first embodiment. That is, the oscillator 40 may be arranged to be orthogonal to the flow in the middle of the long axis of the flow channel unit 30 as a modification example of the first embodiment and the like.

<Effect and the Like>

As described above, it is possible to reduce the power consumption at the driving time while securing the suspension processing performance according to the suspension processing device of each embodiment.

In the foregoing, the invention made by the inventors of the present invention has been concretely described based on the embodiments. However, it is needless to say that the present invention is not limited to the foregoing embodiments and various modifications and alterations can be made within the scope of the present invention. For example, the present embodiment is applicable without being limited to the application of water purification.

REFERENCE SINGS LIST 1A, 1B and 1C suspension processing device
2 drive control unit
3A, 3B and 3C suspension processing unit
11 suspension tank
12 concentrate liquid tank
13 clear liquid tank
14 liquid feed pump
21 switch
22 signal amplifier
30 signal detector
31 output control unit
32 flow channel unit
33 supply port
32 concentrate port
33 outlet port
35A, 35B and 35C tubular structure body
40, 40a and 40b oscillator
51 suspension
52 concentrate liquid
53 clear liquid
60 to 63 liquid feed tube

The invention claimed is:

1. A suspension processing device comprising:
a suspension processing unit configured of a flow channel section in which suspension flows; and
a drive unit that drives the suspension processing unit,
wherein the suspension processing unit is provided with two or more oscillators including a first oscillator and a second oscillator so as to sandwich at least a part of a region of the flow channel section,
the drive unit includes a signal amplification unit,
an ultrasonic wave is generated by electrical connection between the second oscillator and an input unit of the signal amplification unit, and electrical connection between the first oscillator and an output unit of the signal amplification unit,
processing that separates a fine particle or a solid from the suspension is performed in the part of the region by the generated ultrasonic wave, and
wherein the drive unit has a switch that switches electrical connection of the first and second oscillators and the signal amplification unit between an ON state and an OFF state.

2. The suspension processing device according to claim 1, wherein the drive unit includes an output control unit that controls a magnitude of the electrical signal which is input to the first oscillator by the signal amplification unit.

3. The suspension processing device according to claim 1, wherein the drive unit includes a signal detector that detects the electrical signal which is input to the first oscillator by the signal amplification unit.

4. The suspension processing device according to claim 1, wherein an oscillating surface of the first oscillator and an oscillating surface of the second oscillator are arranged to oppose each other in parallel at an inner side or an outer side of surfaces of a structural body that configures the flow channel unit,
the first oscillator converts the electrical signal from the signal amplification unit into the ultrasonic wave through the oscillating surface, and emits the ultrasonic wave into the region of the flow channel unit, and
the second oscillator receives the ultrasonic wave from inside of the region of the flow channel unit by the oscillating surface, converts the ultrasonic wave into the electrical signal, and outputs the electrical signal to the signal amplification unit.

5. The suspension processing device according to claim 1, wherein, in the surfaces of a structural body that configures the flow channel unit,
the suspension processing unit includes:
one or more supply ports that supply the suspension from outside into the flow channel unit; and
two or more outlet ports including a first outlet port and a second outlet port that discharge processing liquids from inside of the flow channel unit to the outside,
a first processing liquid, which contains relatively a large number of the fine particles or the solids separated from the suspension, is discharged through the first outlet port, and
a second processing liquid, which contains relatively a small number of the fine particles or solids separated from the suspension, is discharged through the second outlet port.

6. The suspension processing device according to claim 5, wherein, in the surfaces of the structural body that configures the flow channel unit,
the suspension processing unit includes:
the second outlet port at a position in the vicinity of the first oscillator;
the supply port at a position in the vicinity of the second oscillator; and
the first outlet port at a position between the second outlet port and the supply port.

7. The suspension processing device according to claim 5, wherein, in the surfaces of the structural body that configures the flow channel unit,
the suspension processing unit includes:
the second outlet port at a position in the vicinity of the first oscillator;
the first outlet port at a position in the vicinity of the second oscillator; and
the supply port at a position between the second outlet port and the first outlet port.

8. The suspension processing device according to claim 1, wherein the flow channel unit of the suspension processing unit is configured of a structural body having a shape of two or more branches, and
the first oscillator and the second oscillator are provided so as to sandwich a first region on a side at which the flow channel unit is not branched.

9. The suspension processing device according to claim 5, wherein the flow channel unit of the suspension processing unit is configured of the structural body having a shape of two or more branches,
the first oscillator and the second oscillator are provided so as to sandwich a first region on a side at which the flow channel unit is not branched, and
the supply port is provided in the first region on the side at which the flow channel unit is not branched, the first outlet port is provided in a first branch region on a side at which the flow channel unit is branched, and the second outlet port is provided in a second branch region on the side at which the flow channel unit is branched.

10. The suspension processing device according to claim 1, wherein the ultrasonic wave is generated by amplifying a signal between the first oscillator connected to the output unit and the second oscillator connected to the input unit.

11. The suspension processing device according to claim 1,
wherein the processing realizes the separation as the fine particle or the solid in the suspension is captured by the ultrasonic wave.

12. The suspension processing device according to claim 1,
wherein the fine particle or the solid contained in the suspension is smaller than an interval between an antinode and a node of a sound field to be formed by the ultrasonic wave.

13. A suspension processing device comprising:
a suspension processing unit configured of a flow channel section in which suspension flows; and
a drive unit that drives the suspension processing unit,
wherein the suspension processing unit is provided with two or more oscillators including a first oscillator and a second oscillator so as to sandwich at least a part of a region of the flow channel section,
the drive unit includes a signal amplification unit,
an ultrasonic wave is generated by electrical connection between the second oscillator and an input unit of the signal amplification unit, and electrical connection between the first oscillator and an output unit of the signal amplification unit, and
processing that separates a fine particle or a solid from the suspension is performed in the part of the region by the generated ultrasonic wave;
wherein, in the surfaces of a structural body that configures the flow channel unit,
the suspension processing unit includes:
  one or more supply ports that supply the suspension from outside into the flow channel unit; and
  two or more outlet ports including a first outlet port and a second outlet port that discharge processing liquids from inside of the flow channel unit to the outside,
a first processing liquid, which contains relatively a large number of the fine particles or the solids separated from the suspension, is discharged through the first outlet port, and
a second processing liquid, which contains relatively a small number of the fine particles or solids separated from the suspension, is discharged through the second outlet port;
wherein, in the surfaces of the structural body that configures the flow channel unit,
the suspension processing unit includes:
the second outlet port at a position in the vicinity of the first oscillator;
the supply port at a position in the vicinity of the second oscillator; and
the first outlet port at a position between the second outlet port and the supply port;
wherein the suspension processing unit includes an opening portion in at least one of the first oscillator and the second oscillator, and
the supply port, the first outlet port, or the second outlet port is provided at a position of the oscillator having the opening portion.

14. A suspension processing device comprising:
a suspension processing unit configured of a flow channel section in which suspension flows; and
a drive unit that drives the suspension processing unit,
wherein the suspension processing unit is provided with two or more oscillators including a first oscillator and a second oscillator so as to sandwich at least a part of a region of the flow channel section,
the drive unit includes a signal amplification unit,
an ultrasonic wave is generated by electrical connection between the second oscillator and an input unit of the signal amplification unit, and electrical connection between the first oscillator and an output unit of the signal amplification unit, and
processing that separates a fine particle or a solid from the suspension is performed in the part of the region by the generated ultrasonic wave;
wherein, in the surfaces of a structural body that configures the flow channel unit,
the suspension processing unit includes:
  one or more supply ports that supply the suspension from outside into the flow channel unit; and
  two or more outlet ports including a first outlet port and a second outlet port that discharge processing liquids from inside of the flow channel unit to the outside,
a first processing liquid, which contains relatively a large number of the fine particles or the solids separated from the suspension, is discharged through the first outlet port, and
a second processing liquid, which contains relatively a small number of the fine particles or solids separated from the suspension, is discharged through the second outlet port;
wherein, in the surfaces of the structural body that configures the flow channel unit,
the suspension processing unit includes:
the second outlet port at a position in the vicinity of the first oscillator;
the first outlet port at a position in the vicinity of the second oscillator; and
the supply port at a position between the second outlet port and the first outlet port;
wherein the suspension processing unit includes an opening portion in at least one of the first oscillator and the second oscillator, and
the supply port, the first outlet port, or the second outlet port is provided at a position of the oscillator having the opening portion.

* * * * *